US012794238B2

(12) United States Patent
Kamajaya et al.

(10) Patent No.: US 12,794,238 B2
(45) Date of Patent: Nov. 10, 2026

(54) METHOD FOR CONTROLLING A MICROGRID AND ASSOCIATED MICROGRID

(71) Applicants: Schneider Electric Industries SAS, Rueil-Malmaison (FR); Institut Polytechnique de Grenoble, Grenoble (FR); Université Grenoble Alpes, Saint Martin d'Heres (FR); Centre National de la Recherche Scientifique, Paris (FR)

(72) Inventors: Samuel Kamajaya, Grenoble (FR); Jean Wild, Coublevie (FR); Raphael Caire, Grenoble (FR); Seddik Bacha, Eybens (FR); Jerome Buire, Sassenage (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 73 days.

(21) Appl. No.: 18/894,951

(22) Filed: Sep. 24, 2024

(65) Prior Publication Data

US 2025/0105624 A1 Mar. 27, 2025

(30) Foreign Application Priority Data

Sep. 25, 2023 (EP) .................................... 23306592

(51) Int. Cl.
*H02J 3/388* (2026.01)
*H02J 9/06* (2006.01)

(52) U.S. Cl.
CPC .............. *H02J 3/388* (2020.01); *H02J 9/062* (2013.01)

(58) Field of Classification Search
CPC .......... H02J 3/0073; H02J 3/001; H02J 3/381; H02J 3/388; H02J 3/0012; H02J 3/32
See application file for complete search history.

(56) References Cited

U.S. PATENT DOCUMENTS

2022/0123532 A1* 4/2022 Phillips .................. H02B 1/202
2024/0396324 A1* 11/2024 Zietlow ................ H02H 1/0007

OTHER PUBLICATIONS

Hirose, Keiichi et al., "Development of Multiple Power Quality Supply System", IEEJ Transactions on Electrical and Electronic Engineering, vol. 5, No. 5, Aug. 25, 2010, pp. 523-530.

(Continued)

*Primary Examiner* — Daniel Cavallari
(74) *Attorney, Agent, or Firm* — Quinn IP Law

(57) ABSTRACT

The application relates to a method for controlling a microgrid (10) comprising the steps of:

maintaining a switching device (60) connecting two busbars (30, 40) of the microgrid (10) and a circuit breaker (20) connecting the microgrid (10) to a utility grid (100) closed, the microgrid (10) being operated in a grid connected mode;

measuring (202) a voltage present in the microgrid (10);

determining (205) if the measured voltage corresponds to a loss of voltage or a fault in the microgrid (10); and if a the loss of voltage or fault is detected in the microgrid (10), opening (210) the switching device (60), the critical loads being supplied by the battery energy storage system (50) and the circuit breaker (20) remaining closed during (215) at least a fault ride through period.

14 Claims, 5 Drawing Sheets

(56) References Cited

OTHER PUBLICATIONS

Pipattanasomporn, Manisa, et al., "Securing critical loads in a PV-based microgrid with a multi-agent system", Renewable Energy, vol. 39, No. 1, Jul. 28, 2011, pp. 166-174.

European Search Report dated Mar. 27, 2024 for corresponding European Patent Application No. 23306592.9, 1 page.

* cited by examiner

METHOD FOR CONTROLLING A MICROGRID AND ASSOCIATED MICROGRID

FIELD OF THE INVENTION

The present invention relates to the field of microgrids for the generation and distribution of electricity. More particularly, the invention relates to a method for controlling a microgrid and to a microgrid configured to perform said method.

BACKGROUND OF THE INVENTION

A microgrid is generally a local electrical grid intended to generate and distribute electrical power in regions that are isolated and far from large electrical energy generation centres. Isolated regions are, for example, islands, mountainous regions or desert areas. The microgrid principle is also applicable when a building, neighbourhood, campus or other entity connected to a main grid (also called utility grid) or wide distribution grid wishes to manage the generation of its energy differently and increase its capacity for resilience.

Microgrids are made up of various kind of energy resources that are spatially distributed and disconnected from the utility grid. Such microgrids are set up as autonomous islands for energy supply. These distributed resources may include renewable energy resources, such as photovoltaic cells, solar panels and wind turbines. They further may include engine-generator energy resources, such as fuel consuming engines or turbines. And they may comprise energy storage facilities for locally storing energy, which may include chemical type storage such as battery energy storage systems (BESS) or mechanical type storage such as flywheels.

The main advantage of microgrids is that they can operate autonomously, i.e. in island mode, without connection to the public grid, and are located in proximity to the areas of consumption, the loads. Thus, the losses inherent to long-distance distribution grids are reduced.

To protect the loads from disturbance Uninterrupted Power Supply system (UPS) are known. Double conversion UPS are well known to provide a reliable power supply to critical loads.

In microgrids, some products offer the usage of battery energy storage systems to isolate rapidly from grid disturbance to secure critical loads.

However, in order to comply with the technical specification defining the parameters how a facility is to be connected to a utility grid (grid code), all generators must remain connected for certain period in case of grid disturbance, including the inverter based distributed energy resources. This mandatory requirement is called fault ride through (Low Voltage or Fault Ride Through specification). The minimum period in which all generators must remain connected to the utility grid is called fault ride through period.

As photovoltaic inverters are considered to be generators, the fast transfer is not authorized if a photovoltaic inverter or other inverter based distributed energy resources is/are present in the microgrid.

In the microgrids known from prior art, during the ride through period, all loads connected to the microgrid including critical loads are interrupted from power.

It is an object of the present invention to provide a microgrid complying with the fault ride through requirement of the utility grid for inverter-based generators while providing the resilience to critical loads powered by the microgrid.

SUMMARY OF THE INVENTION

This object is achieved by a method for controlling a microgrid, the microgrid comprising a circuit breaker, a first busbar being configured to be connected to a utility grid through the circuit breaker, several distributed energy resources including at least a battery energy storage system, a second busbar, a switching device, a microgrid controller, non-critical loads and critical loads, the second busbar being connected to the first busbar though the switching device, the critical loads and the battery energy storage system being connected to the second busbar, the method comprising the steps of:

- maintaining the switching device and the circuit breaker closed, the microgrid being operated in a grid connected mode;
- measuring a voltage present in the microgrid;
- determining if the measured voltage corresponds to a loss of voltage or a fault in the microgrid; and
- if the loss of voltage or fault is detected in the microgrid, opening the switching device, the critical loads being supplied by the battery energy storage system and the circuit breaker remaining closed during at least a fault ride through period.

The invention also concerns a microgrid comprising a circuit breaker, a first busbar being configured to be connected to a utility grid through the circuit breaker, several distributed energy resources including at least a battery energy storage system, a second busbar, a switching device, a microgrid controller, non-critical loads and critical loads, the second busbar being connected to the first busbar though the switching device, the critical loads and the battery energy storage system being connected to the second busbar, the microgrid being configured to perform the controlling method described above.

The invention also concerns the following optional features of the invention, considered independently or according to technically allowable combinations.

The voltage present in the microgrid is measured by means of a voltage measuring device which determines if the measured voltage correspond to a loss of voltage.

The method further comprises opening the circuit breaker if the measured voltage still corresponds to the loss of voltage or the fault in the microgrid after the fault ride through period has elapsed.

The microgrid further comprises a protective relay configured to detect the fault and/or the loss of voltage in the microgrid and to open the circuit breaker after the fault and/or the loss of voltage is detected, the method further comprising opening the circuit breaker by the protective relay if the protective relay detects the fault and/or the loss of voltage in the microgrid after the fault ride through period has elapsed.

After the circuit breaker has been opened, the switching device is closed, the distributed energy resources supplying non-critical and critical loads in an islanded mode of the microgrid according to a calculated energy distribution.

The fault ride through period is longer than the opening time of the circuit breaker.

After the fault ride through period has elapsed, if the voltage measured by the voltage measuring device does no longer correspond to the loss of voltage or the fault in the microgrid and/or the protective relay detects no fault or loss of voltage in the microgrid, the switching device is closed.

The battery energy storage system is operated in a grid-forming mode or a virtual synchronous generator mode when the switching device is opened after the detection of the loss of voltage or fault in the microgrid.

The battery energy storage system is operated in a grid-tie mode or a virtual synchronous generator mode while the circuit breaker and/or the switching device are maintained closed and the microgrid is operated in a grid connected mode.

According to embodiments, the microgrid further comprises a voltage measuring device connected to the microgrid controller, the voltage measuring device being configured to determine if the measured voltage correspond to a loss of voltage.

According to embodiments, the microgrid further comprises a protective relay configured to detect the fault and/or the loss of voltage in the microgrid and to open the circuit breaker after the fault and/or the loss of voltage is detected.

According to embodiments, the switching device is a static switch or hybrid breaker The method and the microgrid according to the present invention allow critical loads to be immediately isolated during grid disturbance, while distributed energy resources of the microgrid remain connected to the utility grid until the fault ride through has finished.

Once the fault ride through period has elapsed, the switching device can be closed to give a voltage reference to the distributed energy resources. The distributed energy resource's ride through settings shall be set at least as long as the utility grid requires, and more particularly more than the breaker opening time, which is typically between 30 ms to 50 ms plus the utility grid fault ride through requirements. Therefore, the distributed energy resources can remain in operation after the microgrid is disconnected from the utility grid.

BRIEF DESCRIPTION OF THE DRAWINGS

Features of the preferred embodiment described below will be apparent when read in conjunction with the drawings, wherein.

DETAILED DESCRIPTION OF EMBODIMENTS

Figure 1:
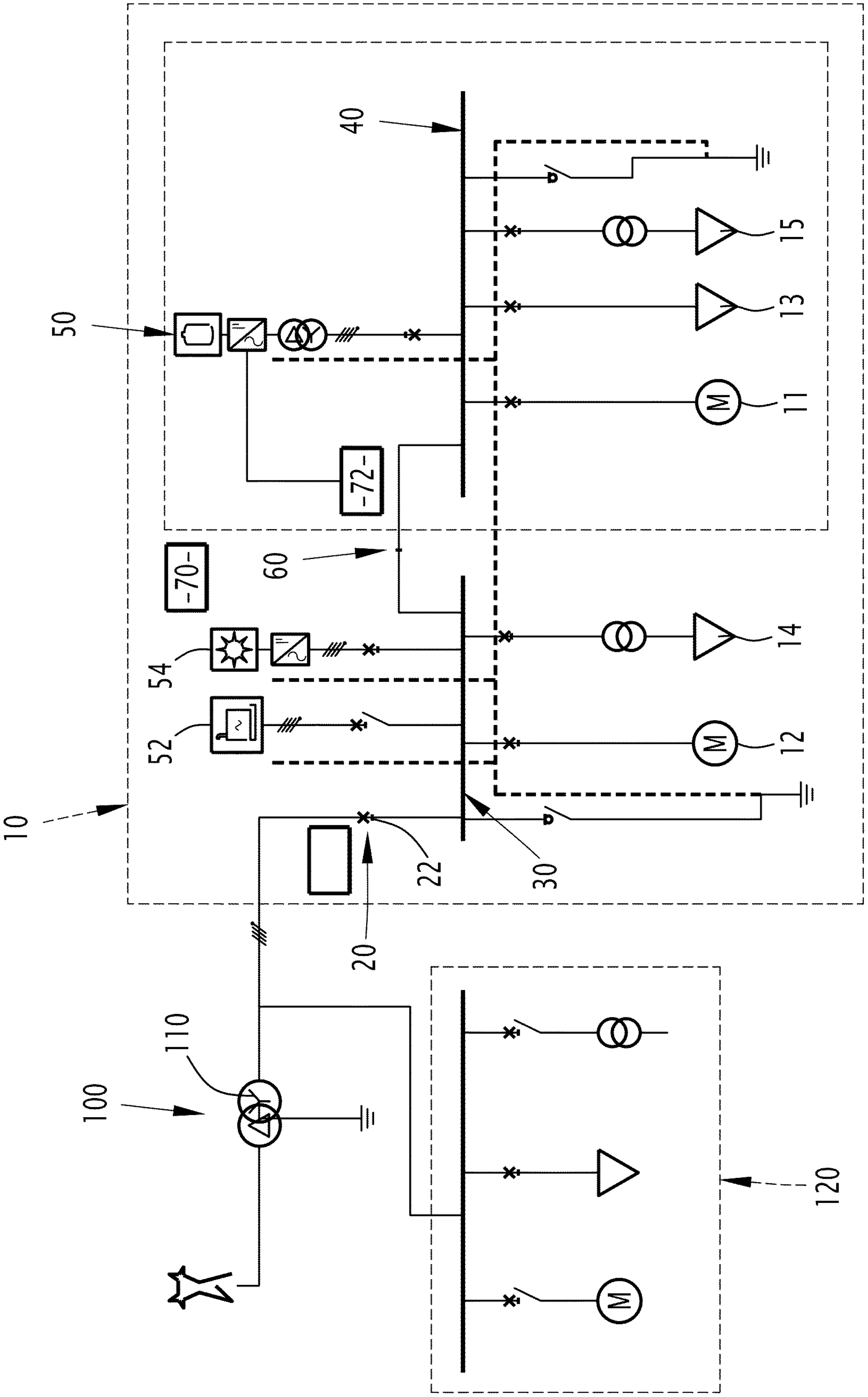
FIG. 1 is a single-line diagram representing a microgrid according to the preferred embodiment of the invention.

The present application concerns a method for controlling a microgrid 10 and a microgrid 10 configured to perform said method.

The microgrid comprises a circuit breaker 20, also called main breaker, a first busbar 30 being configured to be connected to a utility grid 100 through the circuit breaker 20, several distributed energy resources including at least a battery energy storage system 50, a second busbar 40, a switching device 60, a microgrid controller 70, non-critical loads and critical loads.

The second busbar 40 is connected to the first busbar 30 though the switching device 60. The critical loads and the battery energy storage system 50 are connected to the second busbar 40. The microgrid 10 is configured to perform the method according to the present application.

The utility grid 100 may comprise a dedicated medium voltage and/or low voltage transformer 110. If the microgrid 10 is small, the transformer 110 is usually owned by a utility and shared with other client grids 120.

The distributed energy resources include the at least one battery energy storage system 50 and preferably also comprise a generator 52 and/or a photovoltaic inverter 54.

The non-critical loads preferably comprise a heating, ventilation, and air-conditioning device (HVAC) 12 and/or other sheddable loads 14. As a non-limitative example, the critical loads comprise an elevator 11, a server 13 and/or a lighting installation 15, and more generally any type of security systems.

The first busbar 30 is connected to the circuit breaker 20 on the one end and to the second busbar 40 via the switching device 60 on the other end. The first busbar 30 may be referred to as the main busbar. The second busbar 40 may be referred to as the critical busbar. Preferably, all critical loads of the microgrid 10 are connected to the second busbar 40 and/or all non critical loads are connected to the first busbar 30.

The microgrid 10 preferably further comprises a measuring device 72 connected to the microgrid controller 70 and configured to measure a voltage present in the microgrid 10.

The measuring device 72 is preferably configured to measure a voltage present on the first busbar 30 and/or the second busbar 40, and to determine if the measured voltage corresponds to a loss of voltage or a fault in the microgrid 10. The measuring device 72 may form part of the switching device 60.

Preferably, the microgrid 10 further comprises a protective relay 22 configured to detect the fault and/or the loss of voltage in the microgrid 10 and to open the circuit breaker 20 after the fault and/or the loss of voltage is detected. The protective relay 22 may also be configured to measure a voltage present in the microgrid 10. The protective relay 22 is preferably connected to the microgrid controller 70.

According to a preferred embodiment, the protective relay 22 is further configured to detect an undervoltage in the microgrid 10, an underfrequency in the microgrid 10, a reverse power in the microgrid 10, and a rate of change of frequency (ROCOF) in the microgrid 10.

In a preferred embodiment, the switching device 60 is a static switch.

According to a variant, the switching device 60 is a hybrid breaker.

The microgrid 10 is configured to be operated in a grid connected mode when the switching device 60 and the circuit breaker 20 are closed.

Figure 3:
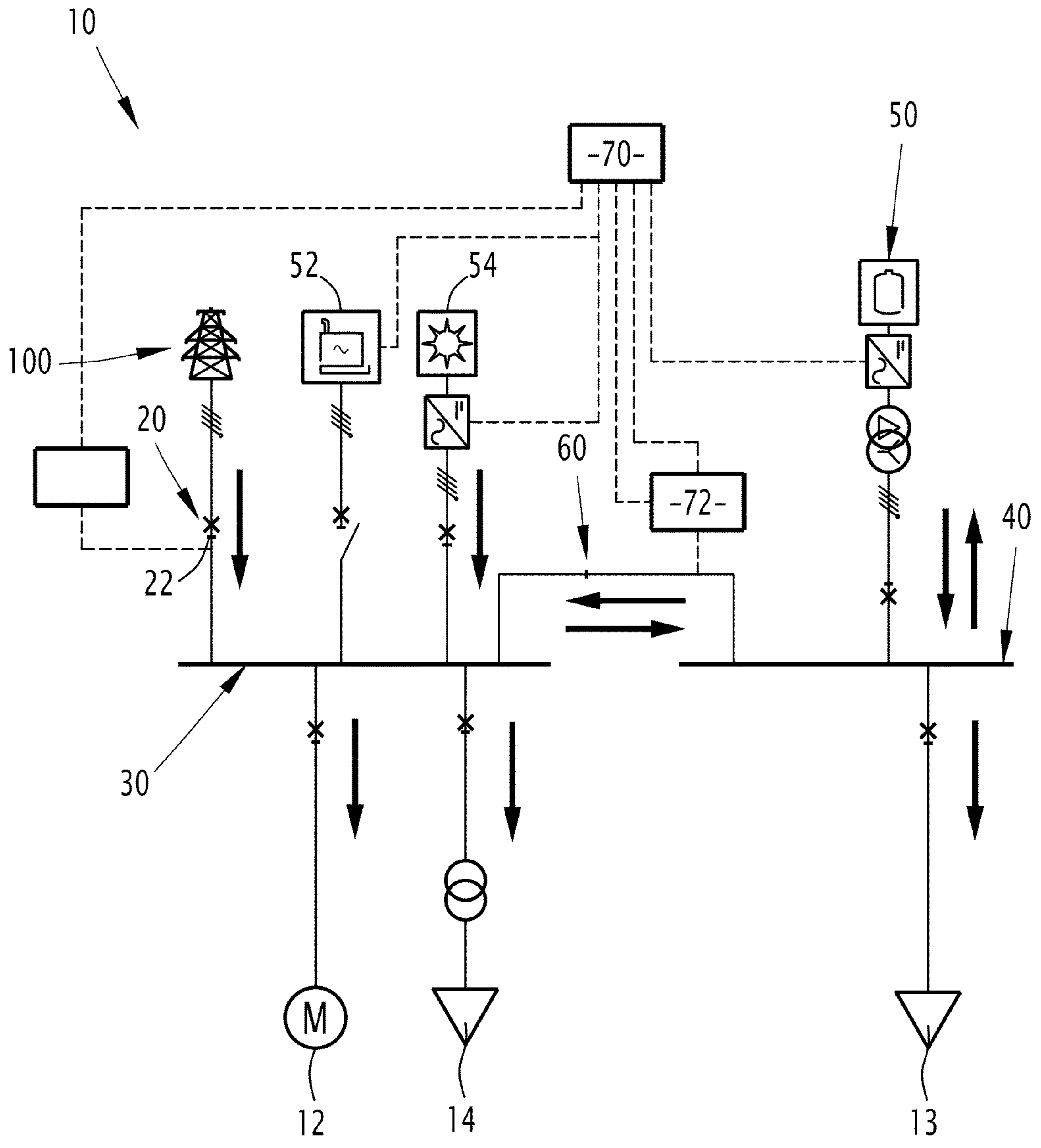
FIG. 3 is a single-line diagram representing the micro-grids and illustrating a grid connected mode of the micro-grid.

FIG. 3 depicts the operation of the microgrid 10 in grid connected mode. The utility grid 100 provides active and reactive power to the microgrid 10 to offset imbalances between power production and demand on the microgrid 10. Preferably, the photovoltaic inverter 54 is configured to inject an amount of power to the first busbar 30 and second busbar 40 to be consumed by the critical and non-critical loads, to be stored or to be reinjected into the utility grid 100. In FIG. 3, the direction of flow of the power is depicted by arrows.

According to an embodiment, the microgrid 10 is further configured to be operated in an islanded mode. In the islanded mode, the circuit breaker 20 is opened, and the connection to the utility grid 100 is therefore lost. If the distributed energy resources with exception of the energy storage system 50 generate more power than is being used by the critical and non-critical loads of the microgrid 10, excess power can be absorbed by the energy storage system 50.

The battery energy storage system 50 is configured to be operated in a grid-forming mode, a virtual synchronous generator mode and/or a grid-tie mode. When the microgrid is operated in grid connected mode, the battery energy storage system 50 may be operated in virtual synchronous generator mode or grid-tie mode. When the microgrid is operated in islanded mode, the battery energy storage system 50 may be operated in virtual synchronous generator mode or grid forming mode. Forming the grid is understood to mean supplying the grid with electrical power without having recourse to a reference electrical signal delivered by another source. In grid forming mode, the battery energy storage system 50 forms the voltage on the microgrid 10. For example, in grid-tie mode, battery energy storage system 50 may inject into the microgrid 10 or absorb active or reactive power from the microgrid 10. The injection and/or absorption may be controlled by the microgrid controller 70.

According to an embodiment, the measuring device 72 is configured to measure an instantaneous output voltage between two lines of the utility grid and process the measured instantaneous output voltage to ascertain a voltage drop or sag in the utility grid. Further, the measuring device 72 is connected to the switching device 60 and is configured to open and/or close the switching device 60. The measuring device 72 is further configured to send information signals, for example information relative to the voltage loss to the microgrid controller 70.

According to an embodiment, the microgrid controller 70 is connected to the switching device 60, configured to control the switching device 60 to open and/or close the switching device 60, connected to the circuit breaker 20 and configured to control the circuit breaker 20 to open and/or close circuit breaker 20. Further preferably, the microgrid controller 70 is connected to the protective relay 22 and configured to control the protective relay 22 to open and/or close the protective relay 22.

In a preferred embodiment, the microgrid controller 70 is connected to each of the distributed energy resources and configured to control each of the distributed energy resources. Preferably, the microgrid controller 70 is configured to set the operating mode of the distributed energy resource. For example, the microgrid controller 70 may change between the grid forming mode, grid-tie mode and the virtual synchronous generator mode of the battery energy storage system 50.

Preferably, the microgrid 10 further comprises a power meter for each of the critical and non-critical loads monitoring the power consumption of the respective load, the microgrid controller 70 being connected to each of the power meters. The power meters can be integrated in a protective device protecting the respective load, such as a switch or a smart breaker.

Figure 2:
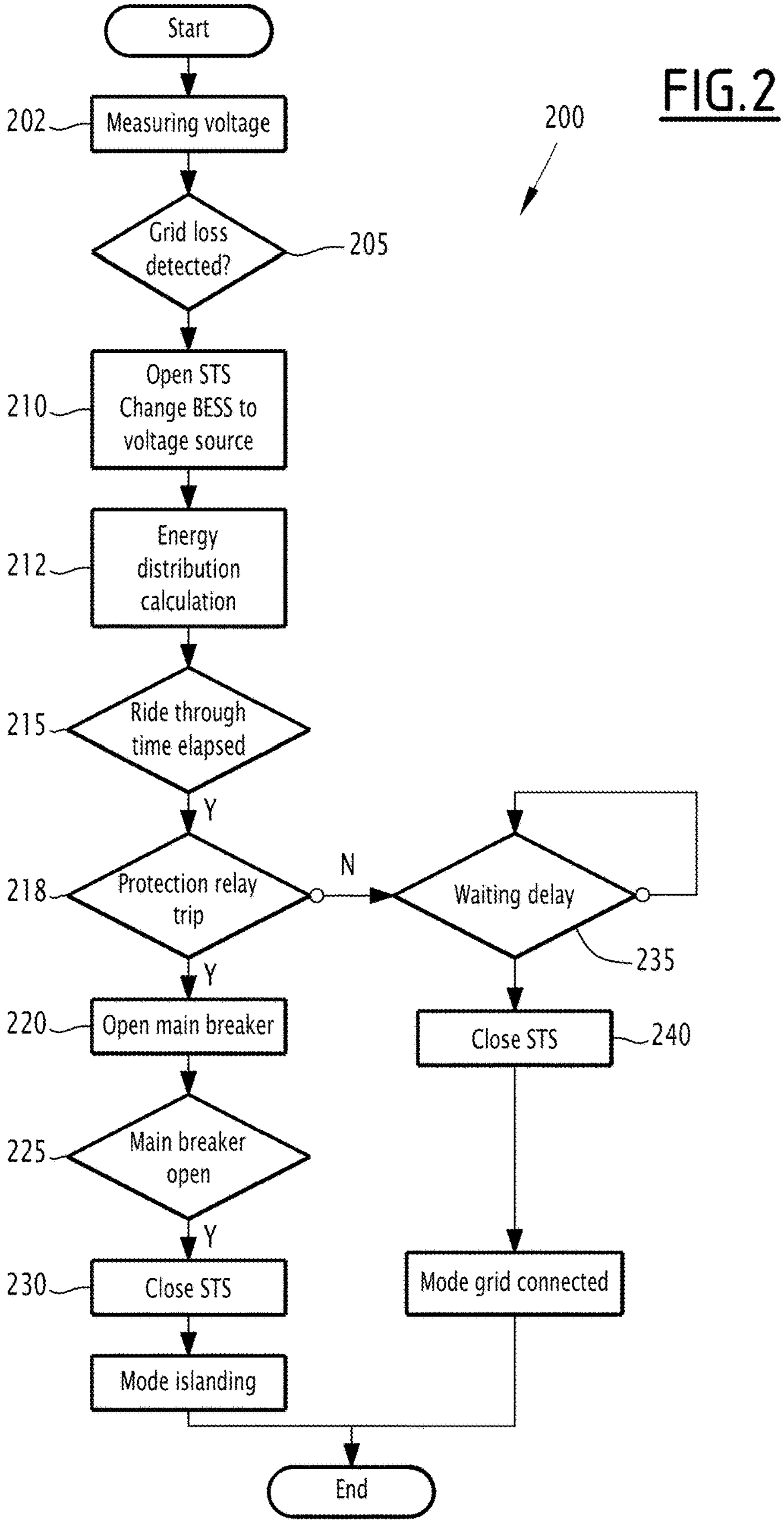
FIG. 2 is a flowchart depicting a method for controlling the microgrid according to the preferred embodiment of the present invention.

The present application further relates to a method 200 for controlling the microgrid. An embodiment of the method 200 is described hereafter with respect to the flowchart of FIG. 2. The method 200 is applied starting as the microgrid 10 being operated in a grid connected mode, maintaining the switching device 60 and the circuit breaker 20 closed. The method 200 comprises:

- measuring 202 a voltage present in the microgrid 10;
- determining 205 if the measured voltage corresponds to a loss of voltage or a fault in the microgrid 10; and
- if a the loss of voltage or fault is detected in the microgrid 10, opening 210 the switching device 60, the critical loads being supplied by the battery energy storage system 50 and the circuit breaker 20 remaining closed during at least a fault ride through period.

The method therefore comprises waiting 215 a period of time equal to the fault ride through period.

Figure 4:
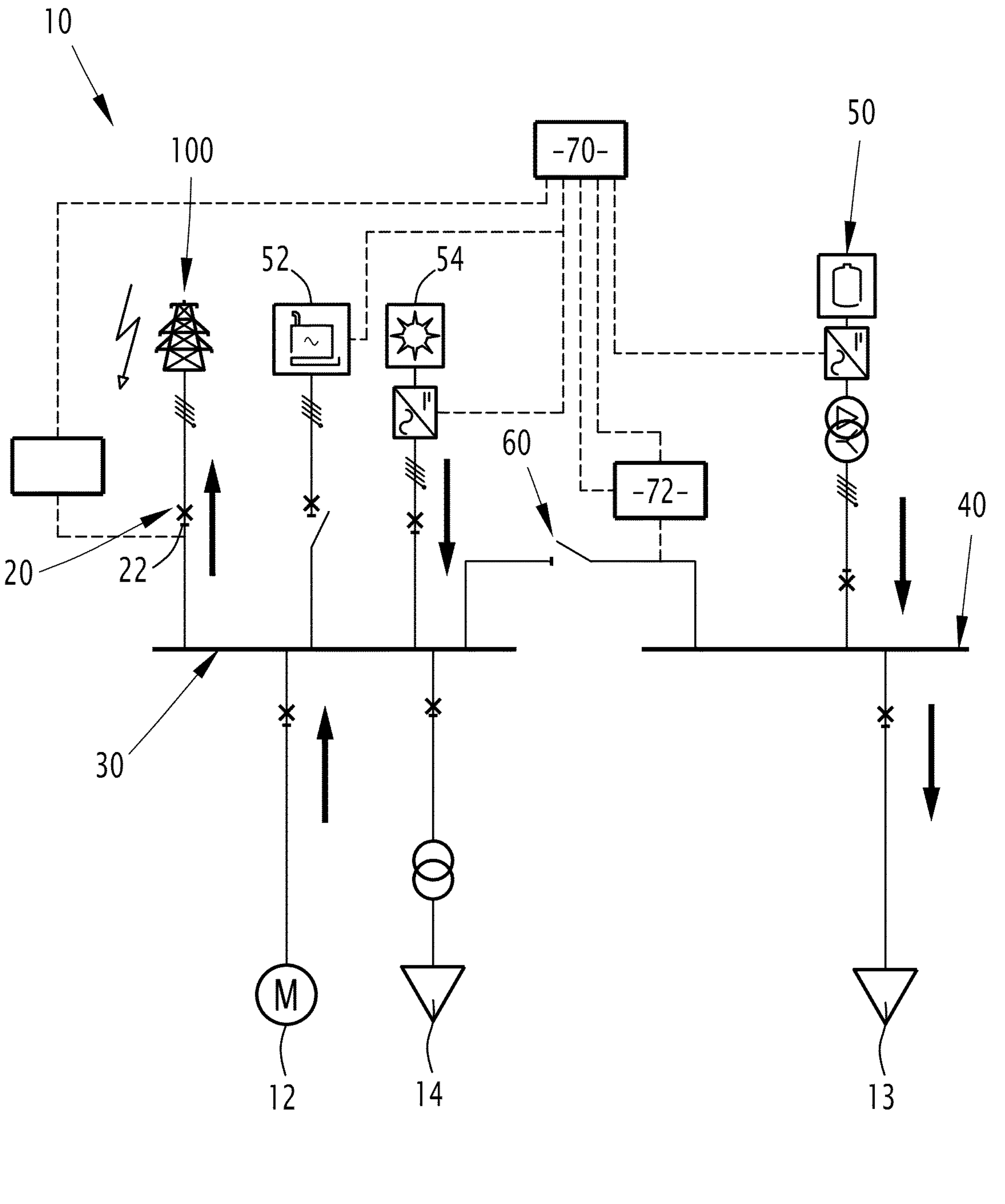
FIG. 4 is a single-line diagram representing the micro-grids and illustrating a grid disturbance event.

Preferably, the fault ride through period is defined by the grid code of the utility grid, the grid code being dependent on local requirements, as shown in FIG. 4.

After the opening 210 of the switching device 20, the battery energy storage system 50 becomes the voltage source for the microgrid.

Preferably, the voltage present in the microgrid 10 is measured by means of the voltage measuring device 72. Alternatively, the voltage present in the microgrid 10 may be measured by the protective relay 22.

According to a preferred embodiment, determining 205 if the measured voltage corresponds to a loss of voltage or a fault in the microgrid 10 is achieved by a fast detection algorithm configured to detect the loss of voltage rapidly.

The method further comprises the following step opening 220 the circuit breaker 20, also called main breaker, if the measured voltage still corresponds to the loss of voltage or the fault in the microgrid 10 after the fault ride through period defined by the grid code has elapsed.

For example, the opening 220 of the circuit breaker 20 is carried if the protective relay 22 detects the fault and/or the loss of voltage in the microgrid 10 after the fault ride through period has elapsed, i.e. if the protective relay 22 is tripped.

In a preferred embodiment, after the circuit breaker 20 has been opened, the switching device 60 is closed 230, the distributed energy resources supplying non-critical and critical loads in an islanded mode of the microgrid 10.

After the opening 210 of the switching device 60 or simultaneously to the opening 210 of the switching device 60, the microgrid controller 70 may perform an energy distribution calculation 212, comprising a load shedding or a generation dispatch-down calculation.

Both the load shedding calculation and the generation dispatch-down calculation comprise the estimation of the power consumption of the critical and non-critical loads and the estimation of the potential power supply to the microgrid 10 in islanded mode by the battery energy storage system 50, the generator 52 and/or the photovoltaic inverter 54.

In case the power provided to the microgrid 10 by the battery energy storage system 50, the generator 52 and/or the photovoltaic inverter 54 in islanded mode are below the consumption of the critical and non-critical loads, the microgrid controller 70 may individually disconnect one or several non-critical loads from the first busbar 30. The disconnection of said non-critical load may be achieved by opening a switch connecting the first busbar 30 to said non critical load.

Preferably, after the fault ride through period has elapsed, if the voltage measured by the voltage measuring device 72 does no longer correspond to the loss of voltage or the fault in the microgrid 10 and/or the protective relay detects no fault or loss of voltage in the microgrid 10, the switching device 60 is closed 240 after the voltage is synchronized. For example, a waiting delay 235 is imposed, the waiting delay duration being chosen so as to allow voltage synchronization.

The battery energy storage system 50 is operated in the grid-forming mode or the virtual synchronous generator mode when the switching device 60 is opened after the detection of the loss of voltage or fault in the microgrid 10.

The battery energy storage system 50 is operated in the grid-tie mode or the virtual synchronous generator mode while the circuit breaker 20 and/or the switching device 60 are maintained closed and the microgrid 10 is operated in a grid connected mode.

FIG. 3 depicts the operation of the microgrid 10 in grid connected mode. The direction of flow of the power is depicted by arrows. In grid connected mode, battery energy storage system 50 is operated in the grid-tie mode or the virtual synchronous generator mode.

FIG. 4 depicts the operation of the microgrid 10 after the event of a grid disturbance, as for instance a loss of voltage or a fault in the microgrid 10, during the fault ride through period. The first busbar 30 remains connected to the utility grid during fault ride through period, while the second busbar 40 is rapidly disconnected from the first busbar 30 by the opening of the switching device 60.

The direction of flow of the power is depicted by arrows. In grid connected mode, battery energy storage system 50 is operated in the grid-tie mode or the virtual synchronous generator mode. The power is then supplied to the critical loads by the battery energy storage system 50. Depending on the type of energy storage system 50 used, the energy storage system 50 may need to change the operation from grid tie mode to grid forming mode, or it can stay in virtual synchronous generator mode.

In a preferred embodiment, if the protective relay 22 has not tripped after the fault ride through period has elapsed, it can be assumed that fault has been cleared. Therefore, the second busbar 30 can be synchronized and the switching device 60 may be closed. The microgrid 10 is then operated in grid connected mode.

On the other hand, if the protective relay 22 has tripped during the fault ride through period, the circuit breaker 20 is opened. Once the circuit breaker 20 is opened, switching device 60 may be closed. The photovoltaic inverter 54 will sense a voltage and supply the available power to the loads. To avoid tripping of the photovoltaic inverter 54, the photovoltaic inverter's 54 ride through settings may be prolonged. The microgrid 10 is then operating in islanded mode.

In islanded mode, depending on the control strategy, the microgrid controller 70 may start generator 52 and synchronize the generator 52 to the first busbar 30, adding some reserve power to the system. This allows the sheddable loads to be reconnected to the first busbar 30, for example by closing the switch connecting said load to the first busbar 30.

When the utility grid 100 is available again, the microgrid controller 70 may synchronize the microgrid 10 to the utility grid 100 and close the circuit breaker 20.

Figure 5:
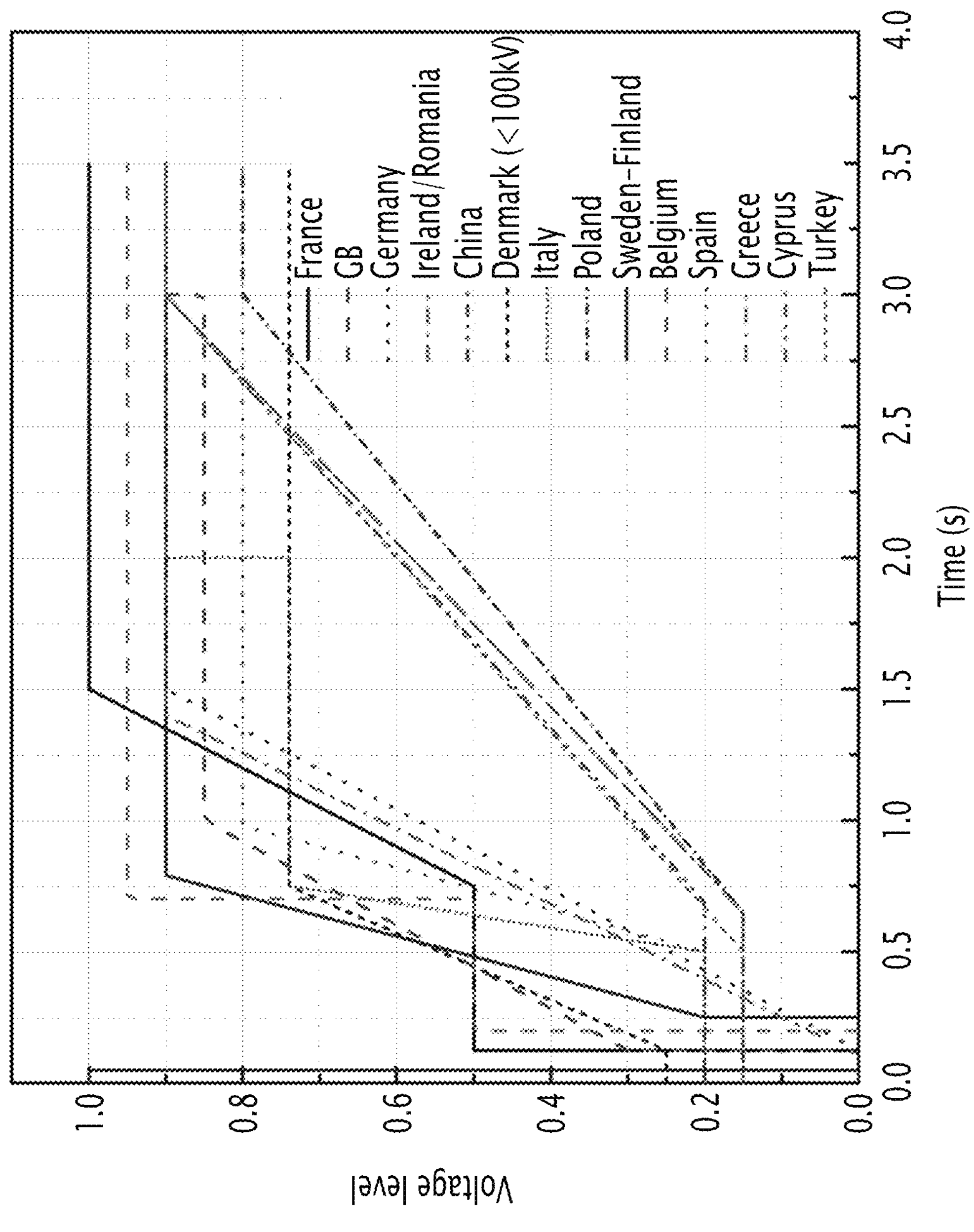
FIG. 5 is a chart representing fault ride through requirements according to different grid codes.

FIG. 5 is a chart representing fault ride through requirements according to different grid codes. The chart represents the length of the fault ride through period dependent on the voltage level and on the grid code. The chart is conform to the International Transactions on Electrical Energy Systems, Volume: 30, Issue: 10, First published: 27 Jul. 2020, DOI: (10.1002/2050-7038.12524).

The method according to the present application allows for a control strategy enabling continuous operation of the microgrid 10 in case grid fault in the utility grid 100, until the fault ride through is finished. Advantageously, the distributed energy resources may remain in operation after the microgrid is disconnected from the utility grid.

The invention claimed is:

1. A method for controlling a microgrid, the microgrid comprising a circuit breaker, a first busbar being configured to be connected to a utility grid through the circuit breaker, several distributed energy resources including at least a battery energy storage system, a second busbar, a switching device, a microgrid controller, non-critical loads and critical loads, the second busbar being connected to the first busbar though the switching device, the critical loads and the battery energy storage system being connected to the second busbar, the method comprising:

maintaining the switching device and the circuit breaker in a closed state while operating the microgrid in a grid connected mode;

measuring a voltage present in the microgrid, as a measured voltage;

determining if the measured voltage corresponds to a loss of voltage or a fault in the microgrid;

in response to the loss of voltage or fault in the microgrid, opening the switching device and supplying the critical loads via the battery energy storage system; and maintaining the circuit breaker in a closed state for a duration of a fault ride through period, wherein a duration of the fault ride through period is defined by a grid code of the utility grid.

2. The method according to claim 1, wherein the measuring the voltage present in the microgrid comprises using a voltage measuring device.

3. The method according to claim 1, further comprising:

opening the circuit breaker if the measured voltage still corresponds to the loss of voltage or the fault in the microgrid after the fault ride through period has elapsed.

4. The method according to claim 1, the microgrid further comprising a protective relay configured to detect the fault and the loss of voltage in the microgrid, and to open the circuit breaker after the fault is detected, the loss of voltage is detected, or both of the fault and the loss of voltage are detected, the method further comprising:

opening the circuit breaker via the protective relay if the protective relay detects the fault or the loss of voltage in the microgrid after the fault ride through period has elapsed.

5. The method according to claim 1, wherein, the method further comprises:

after the circuit breaker has been opened, closing the switching device; and supplying non-critical and critical loads via the distributed energy resources in an islanded mode of the microgrid according to a calculated energy distribution.

6. The method according to claim 1, wherein the fault ride through period is longer than an opening time of the circuit breaker.

7. The method according to claim 2, the method further comprising:

closing the switching device after the fault ride through period has elapsed, if the voltage measured by the voltage measuring device no longer corresponds to the loss of voltage or the fault in the microgrid, or the protective relay detects no fault or loss of voltage in the microgrid.

8. The method according to claim 1, further comprising:

operating the battery energy storage system in a grid-forming mode or a virtual synchronous generator mode in response to opening the switching device after the detection of the loss of voltage or fault in the microgrid.

9. The method according to claim 1, further comprising:

operating the battery energy storage system in a grid-tie mode or a virtual synchronous generator mode, and operating the microgrid in a grid connected mode, while the circuit breaker and/or the switching device are maintained in the closed state.

10. A microgrid comprising:

a circuit breaker;

a first busbar configured to be connected to a utility grid through the circuit breaker; and several distributed energy resources, including at least a battery energy storage system, a second busbar, a switching device, a microgrid controller, non-critical loads and critical loads, wherein the second busbar is connected to the first busbar though the switching device, the critical loads and the battery energy storage system are connected to the second busbar, and the microgrid is configured to perform the method according to claim 1.

11. The microgrid according to claim 10, further comprising a voltage measuring device connected to the microgrid controller, wherein the voltage measuring device is configured to determine if the measured voltage corresponds to a loss of voltage.

12. The microgrid according to claim 10, further comprising a protective relay configured to detect one or both of the fault or the loss of voltage in the microgrid, and to open the circuit breaker after the fault or the loss of voltage is detected.

13. The microgrid according to claim 10, wherein the switching device is a static switch.

14. The microgrid according to claim 10, wherein the switching device is a hybrid breaker.

* * * * *